US007975139B2

(12) United States Patent
Coulier (10) Patent No.: US 7,975,139 B2
(45) Date of Patent: Jul. 5, 2011

(54) USE AND GENERATION OF A SESSION KEY IN A SECURE SOCKET LAYER CONNECTION

(75) Inventor: Frank Coulier, Grimbergen (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 937 days.

(21) Appl. No.: 10/135,163

(22) Filed: Apr. 30, 2002

(65) Prior Publication Data
US 2002/0166048 A1    Nov. 7, 2002

Related U.S. Application Data

(60) Provisional application No. 60/287,858, filed on May 1, 2001.

(51) Int. Cl.
*H04L 9/32*    (2006.01)
(52) U.S. Cl. ........ 713/169; 713/168; 713/170; 713/171; 713/175; 726/2; 726/3
(58) Field of Classification Search .................. 713/151, 713/168–172, 175–176; 726/5, 2–3; 380/277–278
See application file for complete search history.

(56) References Cited

U.S. PATENT DOCUMENTS

| | | | | |
|---|---|---|---|---|
| 5,241,599 | A | * | 8/1993 | Bellovin et al. ............... 713/171 |
| 5,351,293 | A | * | 9/1994 | Michener et al. ............. 713/171 |
| 5,371,796 | A | * | 12/1994 | Avarne .......................... 713/170 |
| 5,689,563 | A | * | 11/1997 | Brown et al. ................. 380/247 |
| 5,825,890 | A | * | 10/1998 | Elgamal et al. ............... 713/151 |
| 5,953,420 | A | * | 9/1999 | Matyas et al. ................ 713/171 |
| 5,953,424 | A | * | 9/1999 | Vogelesang et al. .......... 713/169 |

(Continued)

OTHER PUBLICATIONS

T. Allen and C. Allen; The TLS Protocol Version 1.0; The Internet Society 1999; pp. 1-80.

(Continued)

*Primary Examiner* — Edan Orgad
*Assistant Examiner* — Yin-Chen Shaw
(74) *Attorney, Agent, or Firm* — Manatt, Phelps & Phillips LLP (57) ABSTRACT

The invention describes a method and system for verifying the link between a public key and a server's identity as claimed in the server's certificate without relying on the trustworthiness of the root certificate of the server's certificate chain. The system establishes a secure socket layer type connection between a client and a server, wherein the server transmits information including the server's public key to the client while establishing the connection. Next, a first information is sent from the client to the server. The client and the server create an identical authentication key using a shared secret known to the server and the client. Next, the server transmits a first encrypted message to the client, wherein the first encrypted message includes the server's public key encrypted with the authentication key. Then, the client decrypts the first encrypted message and verifies the correctness of that message including comparing the public key included in the decrypted first encrypted message to the public key transmitted during the set-up of the secure socket layer type connection to authenticate the client and to establish the trustworthiness of the server's public key and thereby the entire SSL connection. The client then transmits a second encrypted message to the server, wherein the second encrypted message is the first information encrypted with the authentication key. Finally, the server then decrypts the second encrypted message and verifies the correctness of the decrypted second encrypted message to authenticate the client.

39 Claims, 5 Drawing Sheets

U.S. PATENT DOCUMENTS

| | | | | |
|---|---|---|---|---|
| 6,009,173 | A * | 12/1999 | Sumner | 713/156 |
| 6,009,177 | A * | 12/1999 | Sudia | 713/191 |
| 6,061,796 | A * | 5/2000 | Chen et al. | 726/15 |
| 6,085,320 | A * | 7/2000 | Kaliski, Jr. | 713/168 |
| 6,088,805 | A * | 7/2000 | Davis et al. | 726/10 |
| 6,094,485 | A * | 7/2000 | Weinstein et al. | 380/30 |
| 6,134,327 | A * | 10/2000 | Van Oorschot | 380/30 |
| 6,148,404 | A * | 11/2000 | Yatsukawa | 726/2 |
| 6,173,400 | B1 | 1/2001 | Perlman et al. | 713/172 |
| 6,189,098 | B1 * | 2/2001 | Kaliski, Jr. | 713/168 |
| RE37,178 | E * | 5/2001 | Kingdon | 713/170 |
| 6,233,341 | B1 * | 5/2001 | Riggins | 380/277 |
| 6,246,771 | B1 * | 6/2001 | Stanton et al. | 380/286 |
| 6,285,991 | B1 * | 9/2001 | Powar | 705/76 |
| 6,317,829 | B1 * | 11/2001 | Van Oorschot | 713/155 |
| 6,535,980 | B1 * | 3/2003 | Kumar et al. | 713/168 |
| 6,550,011 | B1 * | 4/2003 | Sims, III | 713/193 |
| 6,633,979 | B1 * | 10/2003 | Smeets | 713/151 |
| 6,718,467 | B1 * | 4/2004 | Trostle | 713/171 |
| 6,823,454 | B1 * | 11/2004 | Hind et al. | 713/168 |
| 6,874,084 | B1 * | 3/2005 | Dobner et al. | 713/156 |
| 6,895,507 | B1 * | 5/2005 | Teppler | 726/19 |
| 7,047,409 | B1 * | 5/2006 | Aull et al. | 713/173 |
| 2001/0042051 | A1 * | 11/2001 | Barrett et al. | 705/65 |
| 2002/0002674 | A1 * | 1/2002 | Grimes et al. | 713/156 |
| 2002/0138442 | A1 * | 9/2002 | Hori et al. | 705/59 |
| 2002/0157019 | A1 * | 10/2002 | Kadyk et al. | 713/201 |
| 2003/0041244 | A1 * | 2/2003 | Buttyan et al. | 713/172 |

OTHER PUBLICATIONS

Boyeon Song, Kwangjo Kim, "Comparison of Existing Key Establishment Protocols", Conference on Information Security & Cryptography, Nov. 25, 2000, pp. 1-13.

Alfred J. Menezes, Paul C. van Oorschot, Scott A. Vanstone, "Handbook of Applied Cryptography", CRC Press, 1997, pp. 397-405.

"Microsoft Computer Dictionary, Fifth Edition", Microsoft Press 2002, pp. 93, 288, 429, 495, 522, 576.

R. Khare, S. Lawrence, "Upgrading to TLS Within HTTP/1.1", The Internet Society, May 2000, pp. 1-13.

R. Perlman, C. Kaufman, "Analysis of the IPSec Key Exchange Standard", Proceedings Tenth IEEE International Workshop on Enabling Technologies: Infrastructure for Collaborative Enterprises, WET ICE 2001 p. 150-6, Jun. 20-22, 2001, IEEE Computer Society, Los Alamitos, CA, USA.

Joon S. Park, Ravi Sandhu, "Smart Certificates: Extending X.509 for Secure Attribute Services on the Web", Information and Software Engineering Department, George Mason University, pp. 337-348, 1999.

J. Huges, L. Elteto, N. Cicovic, "Token Interoperability and Portability", Rainbow Technologies, May 2002, pp. 1-13.

C. Kaufman, R. Perlman, M. Speciner, "Network Security: Private Communication in a Public World", Prentice-Hall Inc., 1995, pp. 223 and 249-253.

* cited by examiner

FIG. 1

*(Prior Art)*

USE AND GENERATION OF A SESSION KEY IN A SECURE SOCKET LAYER CONNECTION

PRIORITY

The present application claims the benefit of priority under 35 U.S.C. §119(e) to U.S. Provisional Patent Application entitled "Use and Generation of a Session Key in a Secure Socket Layer Connection," Ser. No. 60/287,858, filed on May 1, 2001, which application is incorporated herein by reference.

CROSS REFERENCE TO RELATED APPLICATIONS

The present application is related to the following United States Patents and Patent Applications, which patent/applications are assigned to the owner of the present invention, and which patents/applications are incorporated by reference herein in their entirety:

U.S. patent application Ser. No. 09/789,197, entitled "Field Programmable Smart Card Terminal and Token Device", filed on Feb. 20, 2001, currently pending;

U.S. Pat. No. 4,599,489, entitled "Solid State Key for Controlling Access to Computer Software", filed on Feb. 22, 1984, issued on Jul. 8, 1986;

U.S. Pat. No. 4,609,777, entitled "Solid State Key for Controlling Access to Computer Software", filed on Dec. 23, 1985, issued on Sep. 2, 1986; and U.S. Pat. No. 4,819,267, entitled "Solid State Key for Controlling Access to Computer Systems and to Computer Software and/or for Secure Communications, filed on Jun. 9, 1987, issued on Apr. 4, 1989.

FIELD OF THE INVENTION

The invention relates generally to establishing secure connections over a network, and more particularly to establishing a secure socket layer type connection over a digital public network.

BACKGROUND

Figure 1:
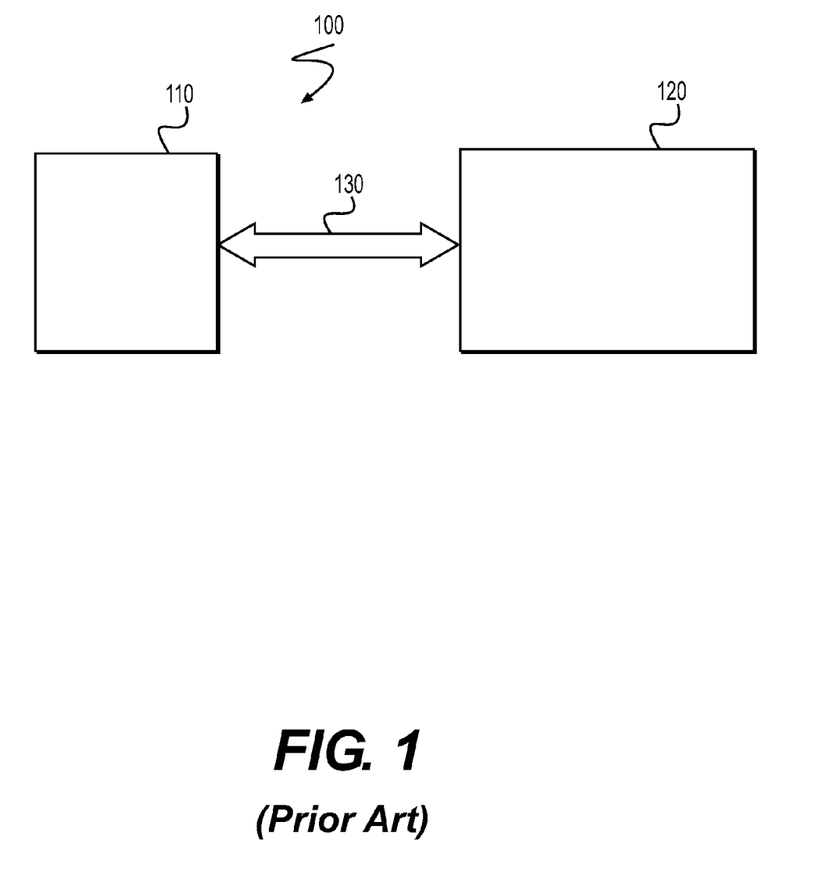
FIG. 1 is a illustration of a server client connection requiring a secured mutually authenticating connection in accordance with the prior art.

Extended development and public acceptance have made electronic commerce and distributed transactions over public networks widespread. As shown in FIG. 1, many of these transactions involve a client device 110, such as a personal computer, accessing and communicating with a server 120. The connection between the client 110 and the server 120 may be used to exchange confidential information or enable the server to provide restricted or secured access. As a result, the need for security in transactions between a client and a server occurring over a digital connection on a network has become widespread as well. Therefore, in many cases, the connection between the client 110 and the server 120 is an encrypted and mutually authenticated connection 130.

The prior art includes several methods that attempt to resolve this need for security that requires mutual authentication and encrypted communication between the server and client. One method utilizes a symmetrical encryption algorithm based on a shared secret. In general, a shared secret is known to both the client and the server. However, a shared secret may sometimes also be possessed by a trusted third party. In general, a shared secret is not known to or easily determined by the public at large. The shared secret is used to derive an encryption key. The encryption key is then used to encrypt communication between the server and the client using a symmetrical encryption algorithm. The symmetrical encryption algorithm achieves confidentiality because the encrypted messages can't be read without knowing the shared secret. The method achieves authentication in that only a participant to the connection who possesses the shared secret may properly encrypt and decrypt messages with another participant. Thus, if a participant can read and generate a message or connection request that is encrypted, the party must possess the secret and is deemed authenticated. For practical reasons, the shared secret often originates from the client side by a physical person operating the client side (e.g. by typing in a password). For ergonomic reasons, the size of the shared secret (e.g. the number of characters in a password) is therefore quite limited. As a result, the cryptographic strength of the symmetric encryption key derived from that shared secret is also rather limited.

Another method used by previous systems involves an asymmetric cryptographic algorithm and public key infrastructure (PKI) certificates for the server and the client. This method does not utilize a shared secret known to both ends of a connection before setting up the connection. Rather, a client and a server exchange certificates when they establish a connection. The client and server then authenticate one another by validating each other's certificates. Next, dynamically generated random data is exchanged by the client and server using the public keys certified by each other's certificates. Both the client and the server use this dynamically generated data to compute separate but identical symmetric encryption key. This symmetric encryption key is then used to encrypt further communication between the client and the server and thereby provide confidentiality. In practice, it may be impractical to provide clients with certificates. As a result, sometimes only the server has a certificate to be validated. In this case, the server certificate is sufficient to authenticate the server and to establish the symmetric encryption key that provides confidentiality. Another method must be used to authenticate the client. For example, the client may provide proof to the server that it possesses a shared secret known only to the server and the client (e.g. the client might send the server a password). As mentioned above, the server end in a secure socket layer connection is authenticated by validating or verifying the server's certificate. The server certificate includes a digital signature generated by a certification authority (CA) linking the server's public key to the server's identity. The public key of the CA may then be certified by another higher-level CA. In theory, an entire hierarchy or chain of certificates may require verification. Regardless of the number of levels in a server's certificate chain, the client must have the public key of the highest level or root CA to be able to validate the entire chain. Thus, the security of this method depends on the trustworthiness of the root's public key.

There are several steps in preparing a PKI certificate. First the data to be signed is assembled. This data includes the public key and data identifying the entity associated with that public key. This data may be considered a message. Next a message digest is created and then the message digest is encrypted. The message digest is a hash of the message or the set of data to be signed. The encrypted message digest is the signature.

In practice, many client systems and network browsers have an extensive list of certificate roots that the client "trusts." It is usually not difficult to convince a user to add additional certificate roots to their list of trusted roots. Thus, a user may unknowingly add a tainted or false certificate root by an illegitimate CA. This false root may have been used by a dishonest entity to generate a certificate for an illegitimate server that poses as a legitimate server. In this way, a dishonest entity may lead a client to make a connection with the illegitimate server and unknowingly provide sensitive information such as the user's password to the legitimate server.

For purposes of illustration, one may consider a bank operating a website that allows bank customers to consult their accounts and perform financial transactions online. Only the rightful owner of an account should have access to their account. Therefore, the bank might require its customers to authenticate themselves by entering a password when accessing the site. To protect the confidentiality of information exchanged between the client and the bank's website such as a user password, clients connect to the bank's website using the SSL protocol. A entity who wants to compromise the account of a legitimate bank customer could mount a man-in-the-middle. To do so, the entity could set up a website that mimics the legitimate bank website. The entity generates a certificate for the fraudulent website with a bogus certification authority. The entity tricks the legitimate customer into adding the root certificate of the bogus CA to his list of trusted roots. If the legitimate customer now connects to the fraudulent website, the legitimate customer will think it's the legitimate bank website and enter a password. The entity has now obtained a valid password and can access the real bank website posing as the legitimate user to e.g. transfer money from the legitimate user's account to the entity's account. Thus, relying on a technique that requires a client to trust the public key of the root CA of a server's SSL certificate to validate the authenticity of that server may reduce the security level of a secure socket layer connection and jeopardize server security.

What is therefore needed is away to increase the security of a secure socket layer connection. A client system should be able to verify the validity of a server's certificate or validate the link between the server's public key and its claimed identity without the client system having to trust the root CA or some intermediate CA of the server's certificate chain.

SUMMARY OF THE INVENTION

The invention satisfies the shortcomings of the prior art by providing a method and system for verifying the link between a public key and a server's identity as claimed in the server's certificate without relying on the trustworthiness of the root certificate of the server's certificate chain. A secure socket layer type connection is established between a client and a server. While establishing the connection, the server transmits the server's certificate information to the client. Next, information is sent from the client to the server. Then, the client and the server independently create identical authentication keys by utilizing a shared secret known to the server and the client. Next, the server transmits a first encrypted message to the client over the secure socket layer connection, wherein the first encrypted message is encrypted with the server authentication key and wherein the correctness of the contents of the first message can be verified by the client. Then, the client decrypts the first encrypted message and validates the decrypted first message thus authenticating the server. The client then transmits a second encrypted message to the server, wherein the second encrypted message is encrypted with the client authentication key and wherein the correctness of the contents of the second message can be verified by the server. Finally, the server decrypts the second encrypted message and validates the decrypted second message thus authenticating the client. In one embodiment, the first encrypted message sent by the server to the client contains the server's certificate or public key that was used during the set-up of the secure socket layer type connection. In one embodiment, the shared secret used to create the authentication key may be the response of a strong authentication token. In this embodiment, the strong authentication token maybe a challenge-response, event, internal counter-based or time-based token, or any combination of these three strong authentication token variants.

DETAILED DESCRIPTION

The present invention solves the problems of prior systems by using a secret to verify the link between a public key and a server's identity as claimed in the server's certificate without relying on the trustworthiness of the root certificate of the server's certificate chain. The invention takes the advantages of an SSL type connection without relying on the root certificate needed to verify the server's identity. This is achieved using a symmetric encryption authentication key that the client and server generate independently from each other. The authentication key is used by the server to encrypt the server's public key or certificate that was used to set-up the SSL connection. Thus, the present invention achieves mutual authentication and encryption without depending on the trustworthiness of the server certificate.

One method for establishing a secure connection between a client and server involves using public key infrastructure (PKI) certificates for the server and the client. The first step in this method includes a client and a server exchanging certificates as they establish a connection. The client and server may validate each other's certificates to authenticate one another. However, in some instances, the client may not provide a certificate. Next, dynamically generated random data is exchanged by the client and server using an asymmetric cryptographic algorithm and the public keys certified by the client and server (each by their own cert) certificates. Both the client and the server use this dynamically generated data to computer identical symmetric encryption keys. This symmetric encryption key uses a symmetric encryption algorithm to encrypt all further communication during the connection between the client and the server. A secure socket layer connection or just a secure connection, as used herein shall include all types of connections that are established using the certificate-based method discussed above. Examples of such connections include a secure socket layer (SSL) connection, a transaction layer security (TLS) connections, a wireless TLS (WTLS) connection, an IP secure (IPSEC) connections.

In one embodiment of the present invention, two types of encryption are occurring. The first level of encryption involves the encryption provided by the SSL connection.

Messages sent over an SSL connection are encrypted. The second level of encryption involves the encryption performed by an authentication key. The authentication key is used to encrypt and decrypt messages to ensure that a client or server is who it represents itself to be. Unless otherwise specified, references to encryption herein are intended to pertain to the encryption performed by an authentication key.

Figure 2:
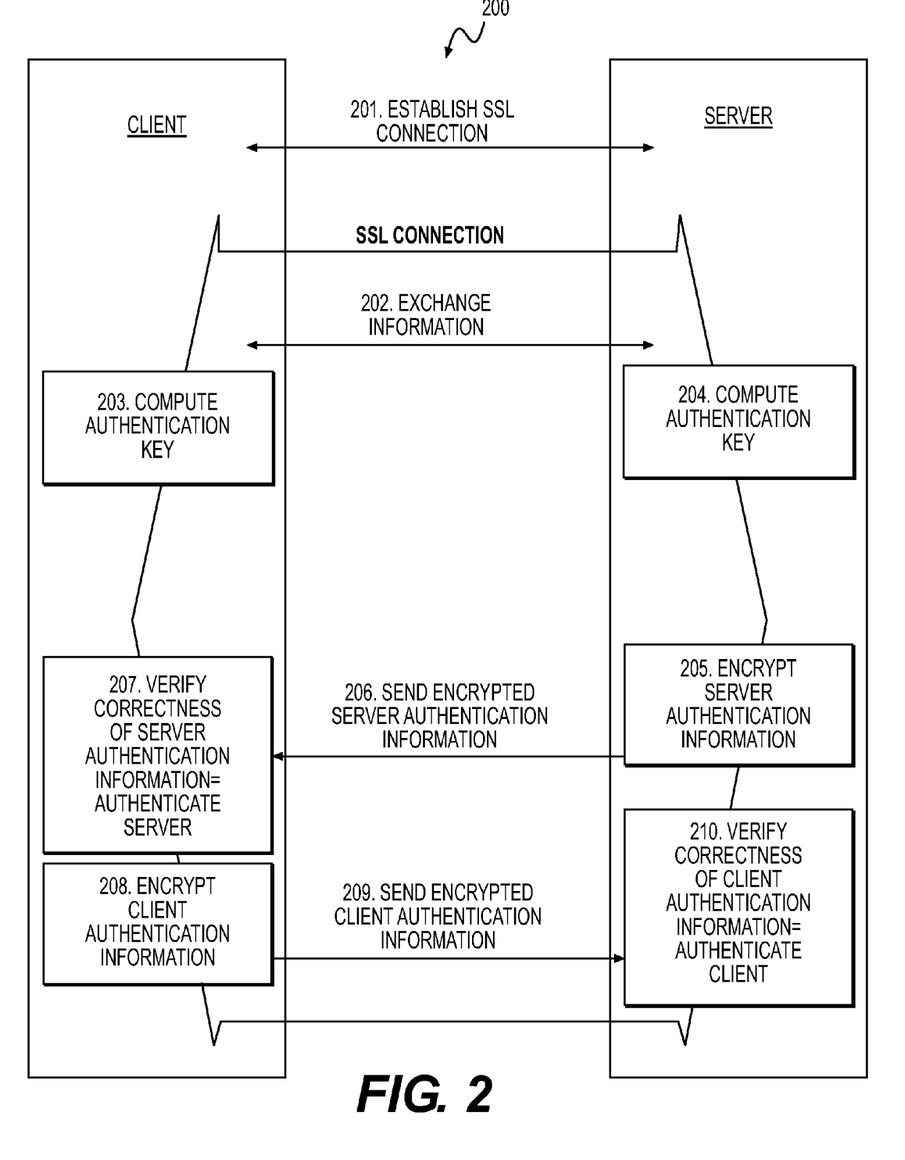
FIG. 2 is an illustration of a method for mutual authentication of an SSL connection in accordance with one embodiment of the present invention.

A method 200 for establishing a server connection between the server and the client in accordance with one embodiment of the present invention is shown in FIG. 2. In method 200, a client and server establish an SSL connection in step 201. This SSL connection may be established with or without using a client certificate. While the SSL connection is being established, the client receives the server's certificate. All further communication between client and server occurs through this SSL connection. In one embodiment, the result of the verification of the server' certificate chain may be ignored.

Next, the authentication key to be used for mutually authenticating the server and the client is created. First, the client and server exchange some information in step 202. Then, the client and server each use the same shared secret to independently compute a symmetric encryption key in steps 203 and 204. This symmetric encryption key is the authentication key. A shared secret as used herein is generally defined as a secret possessed by the client and the server. In one embodiment, a third party such as a certificate authority may possess the secret. However, a secret known to a third party is still considered secret from the public at large. In one embodiment, the shared secret is not transferred between the server and the client.

Next, the client and server are both authenticated. First, the server encrypts server authentication information in step 205. The server constructs this server authentication information so the client may verify its correctness. The server then encrypts the server authentication information with the authentication key generated in the previous step and transmits the encrypted server authentication information to the client in step 206. By successfully decrypting this encrypted server authentication information and verifying its correctness in step 207, the client authenticates the server end of the SSL connection and establishes the trustworthiness of the SSL connection. Next, the client encrypts client authentication information in step 208 with the same authentication key generated in step 203 and sends the encrypted client authentication information to the server in step 209. The server then decrypts the encrypted client authentication information received from the client and verifies its correctness in step 210. By successfully decrypting and verifying the encrypted client authentication information, the server authenticates the client. The client authentication information can include the username and/or part of the information exchanged between client and server earlier on. The authentication key can be used to encrypt any further communication between the server and the client in addition to the encryption already provided by the SSL connection.

Figure 3:
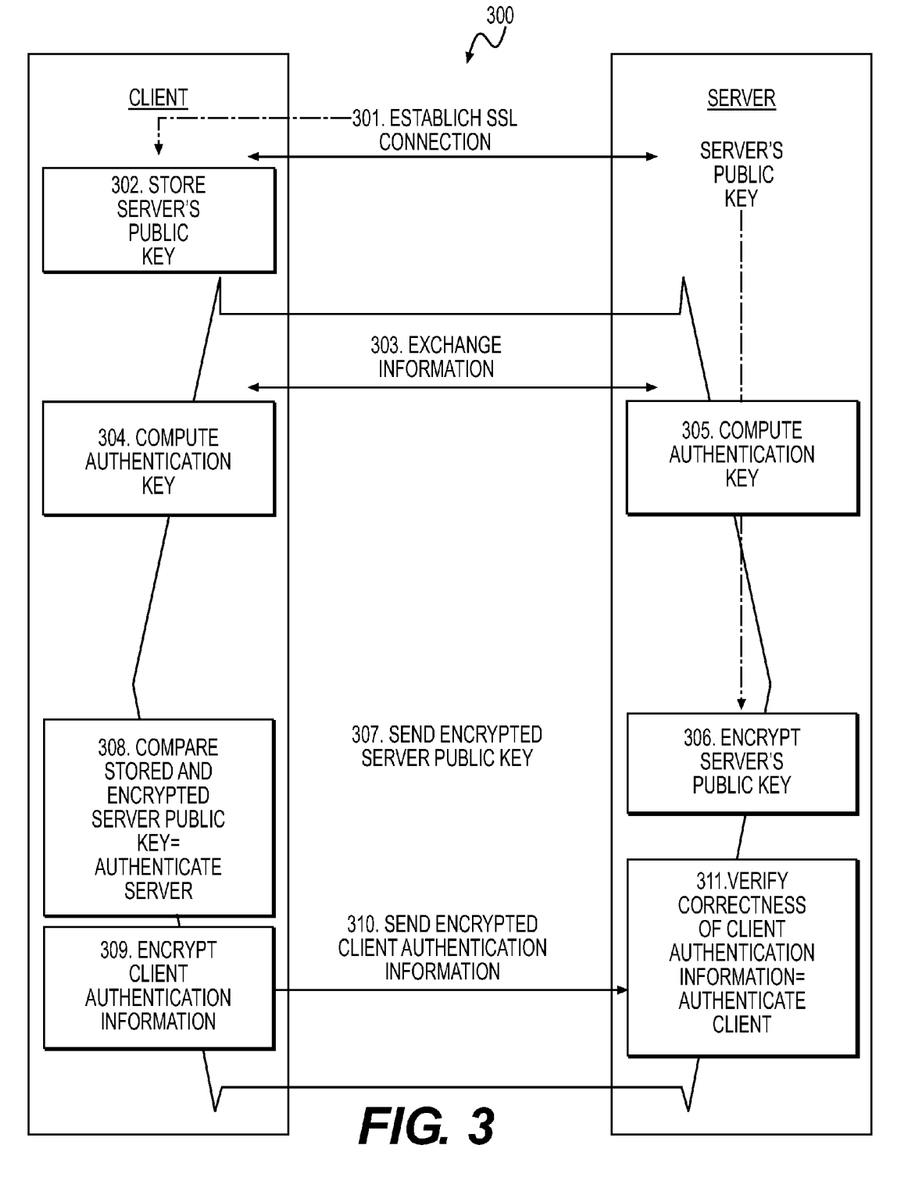
FIG. 3 is an illustration of a method for mutual authentication of an SSL connection in accordance with one embodiment of the present invention.

FIG. 3 illustrates a method for establishing a secure connection between a client and a server in another embodiment of the present invention. In FIG. 3, the server authentication information includes the server's public key that is certified previously by the SSL server certificate. Thus, verifying the correctness of the server authentication information by the client includes verifying that the public key included in the server authentication information is the same as the public key certified by the SSL server certificate. The advantage of this embodiment is that the server's SSL certificate has been authenticated in a way which does not rely on using the public key of the certification authority that signed the SSL server certificate. The SSL connection can now be considered to be a secure, mutually authenticated connection that provides integrity and confidentiality, without the client side having to rely on the trustworthiness of the root certificate that holds the key of the certification authority that signed the SSL server certificate and has been stored on the client.

Method 300 of FIG. 3 begins when the server and client establish a secure socket layer type connection in step 301. This step is similar to the step of 201 in FIG. 2 except that the server sends its certificate to the client. The client then stores the certificate in step 302. Once the connection is established, all communication between the client and server will occur through this connection.

Next, the server and client compute authentication keys. First, the client and server exchange information in step 303. Then, the client and server each use the same shared secret to independently compute a symmetric encryption key in steps 304 and 305. This symmetric encryption key is the authentication key. Next, the server encrypts the server certificate using the symmetric encryption key in step 306 and transmits the encrypted server certificate to the client in step 307. The client compares the stored server certificate from step 302 to the encrypted server certificate sent in step 308 to authenticate the server. The client then encrypts client authentication information in step 309. The encrypted client authentication information is then sent to the server from the client in step 310. The server then decrypts the client authentication information to authenticate the client in step 311.

In another embodiment of the present invention, the entire SSL server certificate may be included in the server authentication information in step 301. Verifying the correctness of the server authentication information by the client in step 308 then includes verifying that the certificate included in the server authentication information is the same as the SSL server certificate received during the set-up of the SSL connection in step 301.

In one embodiment of the present invention, the shared secret used by the client and the server to generate the authentication key is the output of a strong authentication token (SAT). In a preferred embodiment of the invention, the output of the token is the dynamic password generated by the token. In this embodiment, the output of a SAT is provided to both the client and the server. The client and server generate an authentication key using the SAT output. The SAT is not transmitted between the client and the server before generating an authentication key.

In one embodiment of the present invention, the SAT may be a challenge-response token. In this embodiment, the output of the SAT may rely on a challenge to generate a response. If a strong authentication token requires a challenge from the server to generate a dynamic password, the server side of the SSL connection sends this challenge to the client side of the SSL connection. The client and server will both independently generate a separate but identical response to the challenge. The SAT response is then considered the shared secret between the server and client and is used to generate the authentication key.

In another embodiment, the token may be a time-based SAT. This embodiment of a SAT may introduce synchronization issues to generating an authentication key. In one embodiment where strong authentication tokens are based on an internal real-time clock and/or an event such as an internal counter, the server may allow a limited set of possible SAT responses rather than one single SAT response. One reason for allowing multiple SAT responses is to overcome synchronization issues. If a strong authentication token is time based, the server may not be capable of knowing exactly which value of the time the SAT has used to generate its response. This is because the internal clock of the SAT might slightly drift with respect to the server's clock and because the user interaction with the SAT always takes some varying unpredictable time. Similarly, if a strong authentication token is event based, the server is often not capable of knowing exactly which value of the event counter the SAT has used to generate its response. This is because it may be possible that the SAT has generated a response that incremented a counter but didn't reach the server. Thus, the server would not be aware that the event counter has been increased. To overcome the synchronization problems in case of a time or event based SAT, the server may allow a certain number of possible responses rather than a single response. In one embodiment of the present invention, the number of possible responses is relatively small. In the case of a time based SAT, the server will use a window of time around the current time of its real-time clock and will allow multiple responses that can be generated on the basis of time values in that window. Similarly, in the case of an event based token the server will allow multiple responses that can be generated on the basis of the current value of the server's counter and a limited number of consecutive counter values.

In one embodiment, to account for more than one valid response, the server should allow more than one authentication key. However, since the server first sends data to the client encrypted with the authentication key, the server should already know which of the possible authentication keys to use because the client only has one authentication key. To enable the server to figure out which key of the set of possible authentication keys is the one being used by the client, a synchronization phase may be implemented.

Figure 4:
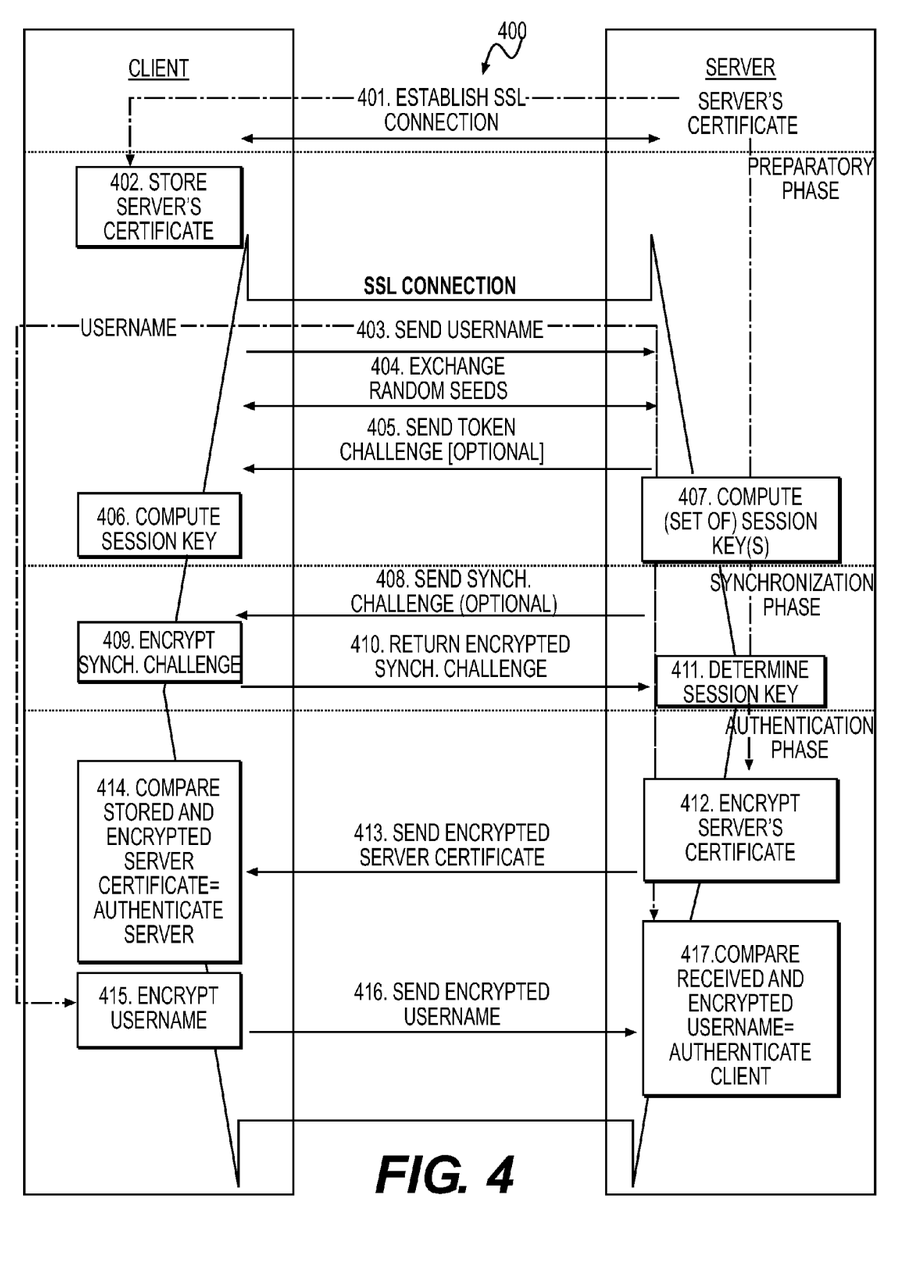
FIG. 4 is an illustration of a method for mutual authentication of an SSL connection, in accordance with one embodiment of the present invention.

FIG. 4 illustrates a method 400 for using a SAT to generate an authentication key. The method 400 begins when the client and server set up an SSL connection in operation 401, with or without client authentication. While the connection is established, the server sends the server certificate to the client. The client obtains and stores the server's certificate in operation 402. Once the connection is established, all further communication between client and server happen through this SSL connection.

Next, the authentication key is established as represented by steps 403 and 404. In operation 403, the client sends information to the server. In one embodiment of the invention, the information is the username or other client authentication information identifying the user at the client end. Next, the server and the client exchange some data that will be used in calculating the authentication key in step 404. In one embodiment of the present invention, the data exchanged are random seeds created independently by the client and server. Next, if the SAT is a challenge-response SAT, the server sends a challenge to the client in operation 405. Then, in operation 406 and 407 the client and server independently generate an identical symmetric encryption key using the response of the SAT and the data exchanged in the operation 404. This symmetric encryption key is the authentication key. Next, if the SAT is a time-based or event-based SAT, the server sends a synchronization challenge to the client in step 408. Then, the client encrypts this synchronization challenge with the authentication key it has computed at step 409. The client then sends the encrypted synchronization challenge back to the server in step 410.

The server then determines what authentication key to use in step 411. In one embodiment, the server computes several acceptable SAT responses using information that may include the SAT challenge, the value of its clock and the current value of the event counter. In one embodiment, the server computes all the acceptable SAT responses. Then, based on the acceptable SAT responses computed and the data exchanged, the server computes a set of candidate authentication keys in operation.

In one embodiment, the server may decrypt the encrypted synchronization challenge it received from the client with each of the authentication keys that are allowed on the basis of its clock or event counter in step 410. The key from the set of allowed keys that successfully decrypts the encrypted synchronization challenge is the key that will be used by the server for authentication purposes.

Next, the client and server are authenticated. First, in operation 412 the server encrypts the certificate that it has sent to the client during the set-up of the SSL connection with its authentication key. The server sends this encrypted certificate to the client in operation 413. Then, in operation 414, the client decrypts the certificate received from the server and compares it to the certificate received from the client in the set-up of the SSL connection. Upon successfully decrypting of the encrypted server certificate and verifying it is the same certificate that the client has obtained during the set-up of the SSL connection, the client authenticates the server end of the SSL connection and establishes the trustworthiness of the SSL connection. Next, in step 415 the client encrypts the username or other client authentication information sent to the server in step 403 with the same authentication key. The client sends this encrypted information to the server in operations 416. The server then decrypts the information and compares it to the information received from the client in step 417. Upon successfully decrypting the encrypted username or other information previously received, the server authenticates the client. The SSL connection can now be considered to be a secure, mutually authenticated connection that provides integrity and confidentiality, without relying on the trustworthiness of the root certificate that has been stored on the client. The authentication key can be used to encrypt any further communication between the server and the client on top of the encryption already offered by the SSL connection.

Figure 5:
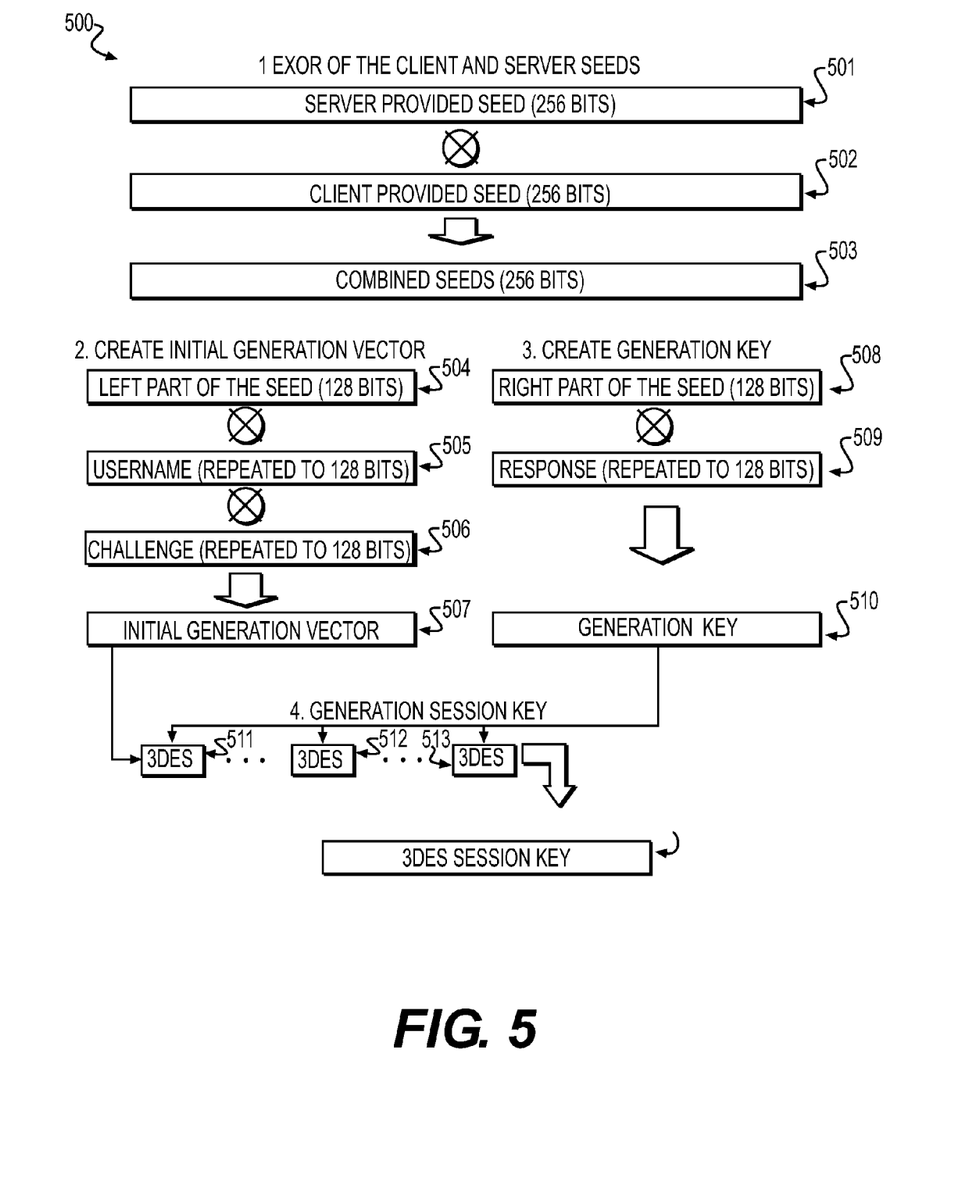
FIG. 5 is an illustration of a method for an authentication key generation process in accordance with one embodiment of the present invention.

FIG. 5 is a flow chart of a process 500 showing a key generation algorithm based on the dynamic password of a challenge-response token in accordance with one embodiment of the present invention. First, in operations 501 and 502, the client and server exchange random seeds. In one embodiment, the seeds are 256 bits in length are processed by both the client and the server in a similar fashion. The seeds are then combined in an operation 503. In one embodiment, the random seeds are combined using an XOR function. If the token is a challenge-response token the server will also provide the client with a challenge for the token. Next, the initial generation vector is created. First, the user name which is known to the both the server and the client at the time of the session key generation is repeated to yield a string of 128 bits in operation 504. A challenge issued by a server and known to both the server and the client is then repeated to yield a string of 128 bits in operation 506. Next, the first 128 bits of the combined random seeds and the expanded user name and the expanded challenge are then combined to yield the Initial Generation Vector in operation 507. In one embodiment of the present invention, the elements are all combined using an XOR function.

Next, the generation key is created. First, the response to the challenge is repeated to yield a string of 128 bits in operation 509. The response is independently generated by both the server and the client. Then, the last 128 bits of the combined seeds and the expanded response are combined to yield the Generating Key. In one embodiment, the elements are combined using an XOR function.

Then, in operation 511, using the generating key as a symmetrical block cypher key, the symmetrical block cipher algorithm is applied X number of times on the Initial Generation Vector with the output of round N serving as the input to round N+1, where X is a fixed number known in advance by both client and server such that the described calculation takes something between 10 and 100 milliseconds on a typical client. Finally, the resulting 128 bits of this calculation are the Authentication Key in operation 512. In one embodiment the symmetrical block cipher algorithm is the 3 DES algorithm. In another embodiment the symmetrical block cipher algorithm is the AES algorithm.

The present invention solves the problems of prior systems by using a secret to verify the link between a public key and a server's identity as claimed in the server's certificate without relying on the trustworthiness of the root certificate of the server's certificate chain. The invention takes the advantages of an SSL type connection without relying on the root certificate needed to verify the server's identity. This is achieved using a symmetric encryption authentication key that the client and server generate independently from each other. The authentication key is used by the server to encrypt the server's public key or certificate that was used to set-up the SSL connection. Thus, the present invention achieves mutual authentication and encryption without depending on the trustworthiness of the server certificate.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for establishing a secure connection and authenticating a server in connections formed with PKI procedures, wherein a server public key, obtained from the server by a client, is used with asymmetric cryptography to establish a symmetric session key for encryption of communications with symmetric cryptography during the connection, said method offering an alternative for authenticating the server public key, and comprising:

generating a symmetric server authentication key by the server, the server authentication key used for encrypting server authentication information;

transmitting a server public key by the server to the client in clear text form;

generating a symmetric client authentication key by the client, the server authentication key and the client authentication key being identical to each other as both are generated using a common secret known to both the client and server, said common secret generated by;

generating a strong authentication token time-based response by a strong authentication token at the client;

deriving a client authentication key from the response by the client;

sending a synchronization challenge from the server to the client;

encrypting the synchronization challenge with the client authentication key by the client;

sending the encrypted synchronization challenge from the client to the server; and generating said server authentication key by the server that corresponds to the client authentication key used by the client, sending server authentication information to the client to authenticate the server, the server authentication information including data related to the server's public key, the server authentication information encrypted by the server using the server authentication key and a symmetric encryption algorithm, decrypting, at the client, received server authentication information with the client authentication key and a symmetric decryption algorithm to obtain data related to the server public key, and verifying the correctness of the server authentication information at the client in order to authenticate the server by comparing the decrypted data related to the server public key with the server public key used in establishing the secure connection and received from the server.

2. The method of claim 1 wherein the server authentication information includes a server certificate.

3. The method of claim 1 wherein the secure connection includes an SSL connection.

4. The method of claim 1 wherein the secure connection includes an WTLS connection.

5. The method of claim 1 wherein the secure connection includes an IPSEC connection.

6. The method of claim 1 wherein the secure connection includes a TLS connection.

7. A method for authenticating a server public key and establishing a secure connection between a client and a server, the connection formed with PKI procedures and including a symmetric key established using the server public key with asymmetric cryptography, said symmetric key used to encrypt communications during the connection with symmetric cryptography, the method, offering an alternative for authenticating the server public key, and comprising:

transmitting a server certificate from the server to the client, the server certificate including server public key information;

generating separate symmetric authentication keys by the server and the client, the keys being identical as generated using a common secret known to both client and server, said generating separate authentication keys including:

sending user authentication information from the client to the server;

exchanging dynamic information between the client and the server;

generating a secret by the client and the server from the response of a strong authentication token, said strong authentication token including a time-based token or an event-based token; and generating symmetric authentication keys at client and server using the user authentication information, the dynamic information, and the secret; thereafter sending server authentication information to the client, the server authentication information including data related to the server public key, the server authentication information encrypted by the server using the symmetric authentication key generated by the server and a symmetric encryption algorithm;

receiving and decrypting the server authentication information by the client, the client decrypting the server authentication information using a symmetric decryption algorithm and the symmetric authentication key created by the client, and verifying the correctness of the server information at the client by comparing the decrypted server authentication information with server public key information from the server certificate.

8. The method of claim 7 wherein the user authentication information includes a user identification information.

9. The method of claim 7 wherein the secure connection is an SSL connection.

10. The method of claim 7 wherein the dynamic information includes random information.

11. The method as recited in claim 1 which further includes:
sending client information to the server to authenticate the client, the client information encrypted by the client using the client authentication key and decrypted by the server using the server authentication key, the correctness of the client information verified by the server.

12. The method as recited in claim 7 further including:
sending encrypted user authentication information to the server, the user authentication information encrypted by the client using the authentication key generated by the client; and
receiving and decrypting the user authentication information by the server, the server decrypting the user authentication information using the authentication key created by the server, the correctness of the user authentication information verified by the server.

13. The method of claim 7 wherein the server certificate transmitted to the client includes the server public key.

14. The method of claim 1 wherein the server authentication information includes the server public key.

15. The method of claim 1 wherein the server authentication information includes data derived from the server public key.

16. The method of claim 15 wherein the data derived from the server public key includes a hash of the server public key.

17. The method of claim 7 wherein the server authentication information includes the server public key.

18. The method of claim 7 wherein the server authentication information includes data derived from the server public key.

19. The method of claim 18 wherein the data derived from the server public key includes a hash of the server public key.

20. A method for establishing a secure connection and authenticating a server public key in connections formed with PKI procedures, wherein the server public key, obtained from the server by a client, is used with asymmetric cryptography to establish a symmetric session key for encryption of communications with symmetric cryptography during the connection and offering an alternative for authenticating the server public key where a symmetric server authentication key is generated by the server and used to encrypt server authentication information for transmission to the client, said method comprising
generating a symmetric client authentication key by the client, the server authentication key and the client authentication key being identical to each other as both are generated using a common secret known to both server and client, said generating said client authentication key including;
generating a strong authentication token time-based response by a strong authentication token at the client;
deriving a client authentication key from the response by the client;
receiving, at the client, a synchronization challenge from the server;
encrypting the synchronization challenge with the client authentication key by the client; and
sending the encrypted synchronization challenge from the client to the server for generating a server authentication key by the server that corresponds to the client authentication key used by the client,
receiving the server public key in clear text form from the server;
receiving encrypted server authentication information at the client to authenticate the server, the server authentication information including data related to the server's public key encrypted with a symmetric encryption algorithm;
decrypting, at the client, the received server authentication information with the symmetric client authentication key and a symmetric decryption algorithm to obtain data related to the server public key, and
verifying the correctness of the server authentication information at the client in order to authenticate the server by comparing the decrypted data related to the server public key with the server public key used in establishing the secure connection and received from the server.

21. The method of claim 20 wherein the server authentication information includes a server certificate.

22. The method of claim 20 wherein the secure connection includes an SSL connection.

23. The method of claim 20 wherein the secure connection includes an WTLS connection.

24. The method of claim 20 wherein the secure connection includes an IPSEC connection.

25. The method of claim 20 wherein the secure connection includes a TLS connection.

26. A method for authenticating a server public key and establishing a secure connection between a client and a server, the connection formed with PKI procedures and including a symmetric key, established using the server public key with asymmetric cryptography, to encrypt communications during the connection with symmetric cryptography, the method offering an alternative for authenticating the server public key, and comprising:
receiving a server certificate at the client, the server certificate including server public key information in clear text form;
generating a symmetric authentication key by the client corresponding to a symmetric authentication key generated at the server, the keys being identical as generated using a common secret known to both client and server, said generating an authentication key by the client including:
sending user authentication information from the client to the server;

exchanging dynamic information between the client and server, generating a secret by the client from a response of a client strong authentication token corresponding to a secret generated by the server, said strong authentication token including a time-based or event-based token; and the client generating said symmetric authentication key, corresponding to a symmetric authentication key generated at the server, using the user authentication information, the dynamic information, and the secret; thereafter receiving server authentication information at the client, the server authentication information including data related to the server public key encrypted using the symmetric authentication key generated by the server and a symmetric encryption algorithm;

decrypting the server authentication information by the client, the client decrypting the server authentication information using a symmetric decryption algorithm and the authentication key created by the client, and verifying the correctness of the server information at the client by comparing the decrypted server authentication information with server public key information received in clear text form.

27. The method of claim 26 wherein the user authentication information includes a user identification information.

28. The method of claim 26 wherein the secure connection is an SSL connection.

29. The method of claim 26 wherein the dynamic information includes random information.

30. The method of claim 26 wherein the strong authentication token includes a challenge-response strong authentication token, wherein the secret is derived from the response of the challenge response token.

31. The method as recited in claim 20 which further includes:

sending client information to the server to authenticate the client, the client information encrypted by the client using the client authentication key.

32. The method as recited in claim 26 further including:

sending encrypted user authentication information to the server, the user authentication information encrypted by the client using the authentication key generated by the client.

33. The method of claim 26 wherein the server certificate received by the client includes the server public key.

34. The method of claim 20 wherein the server authentication information includes the server public key.

35. The method of claim 20 wherein the server authentication information includes data derived from the server public key.

36. The method of claim 35 wherein the data derived from the server public key includes a hash of the server public key.

37. The method of claim 26 wherein the server authentication information includes the server public key.

38. The method of claim 26 wherein the server authentication information includes data derived from the server public key.

39. The method of claim 38 wherein the data derived from the server public key includes a hash of the server public key.

* * * * *